UNITED STATES PATENT OFFICE.

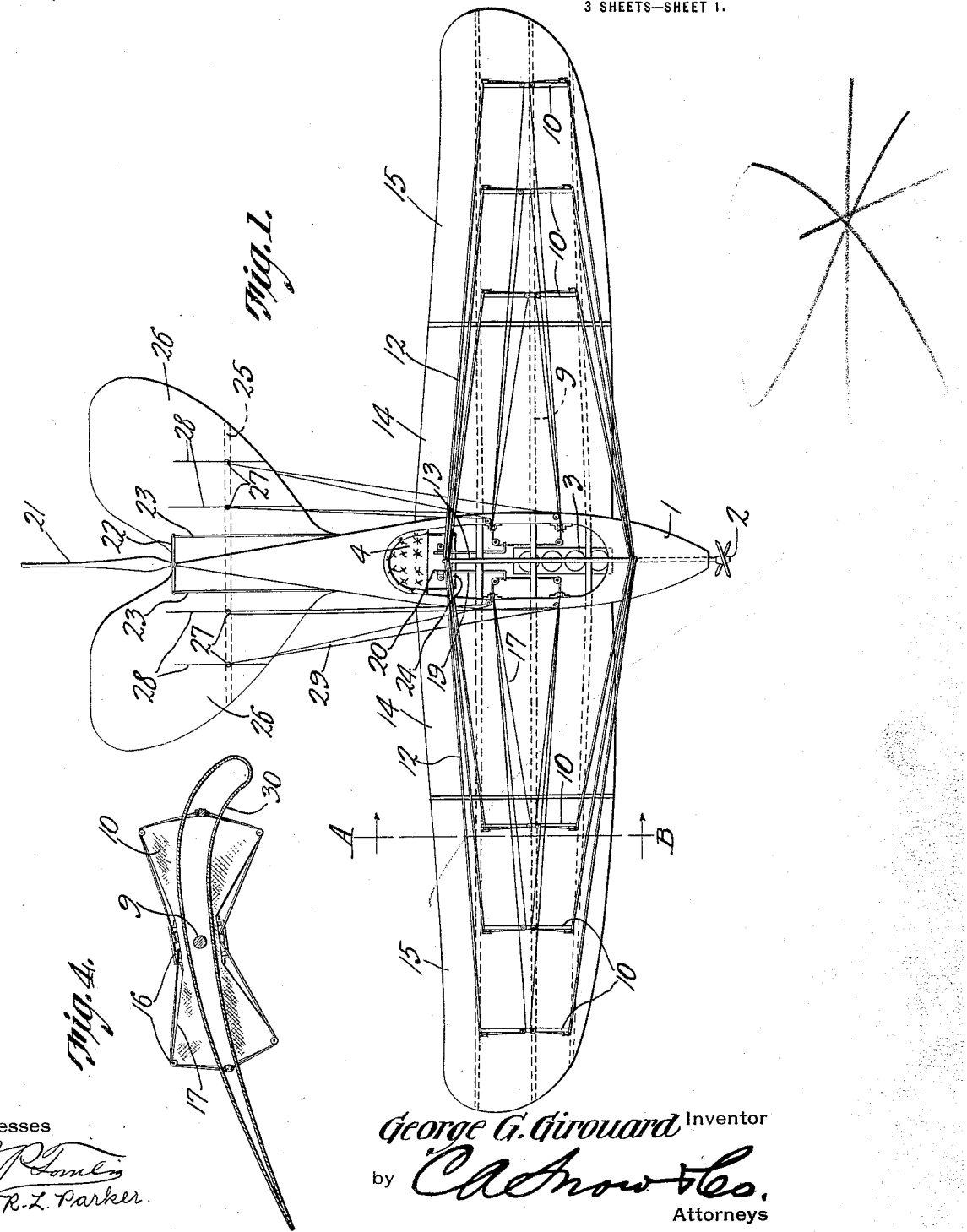

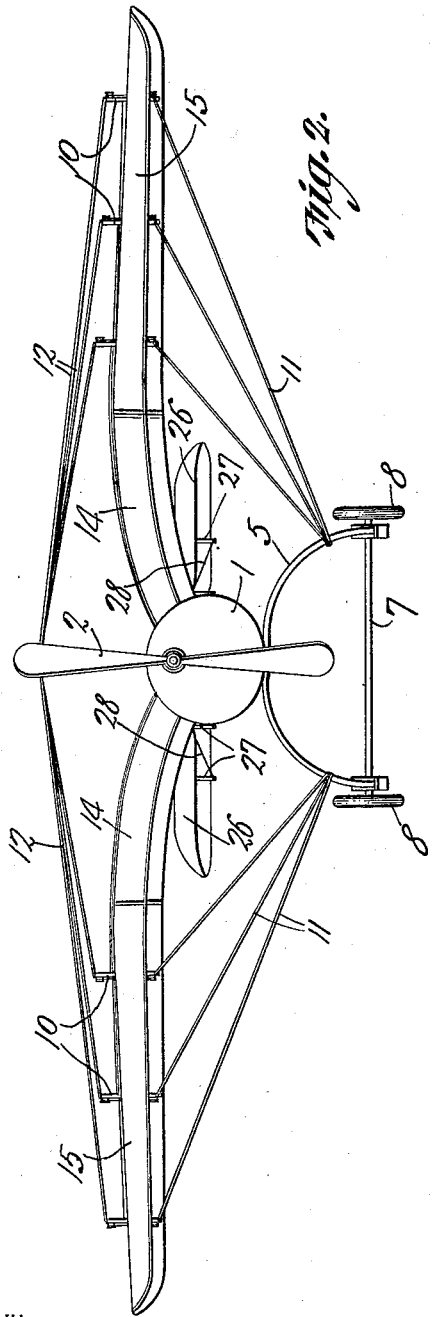
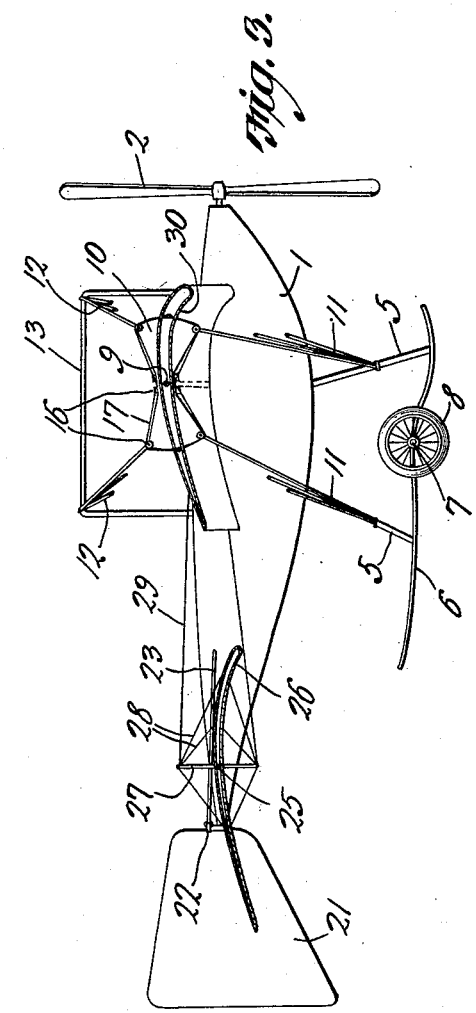

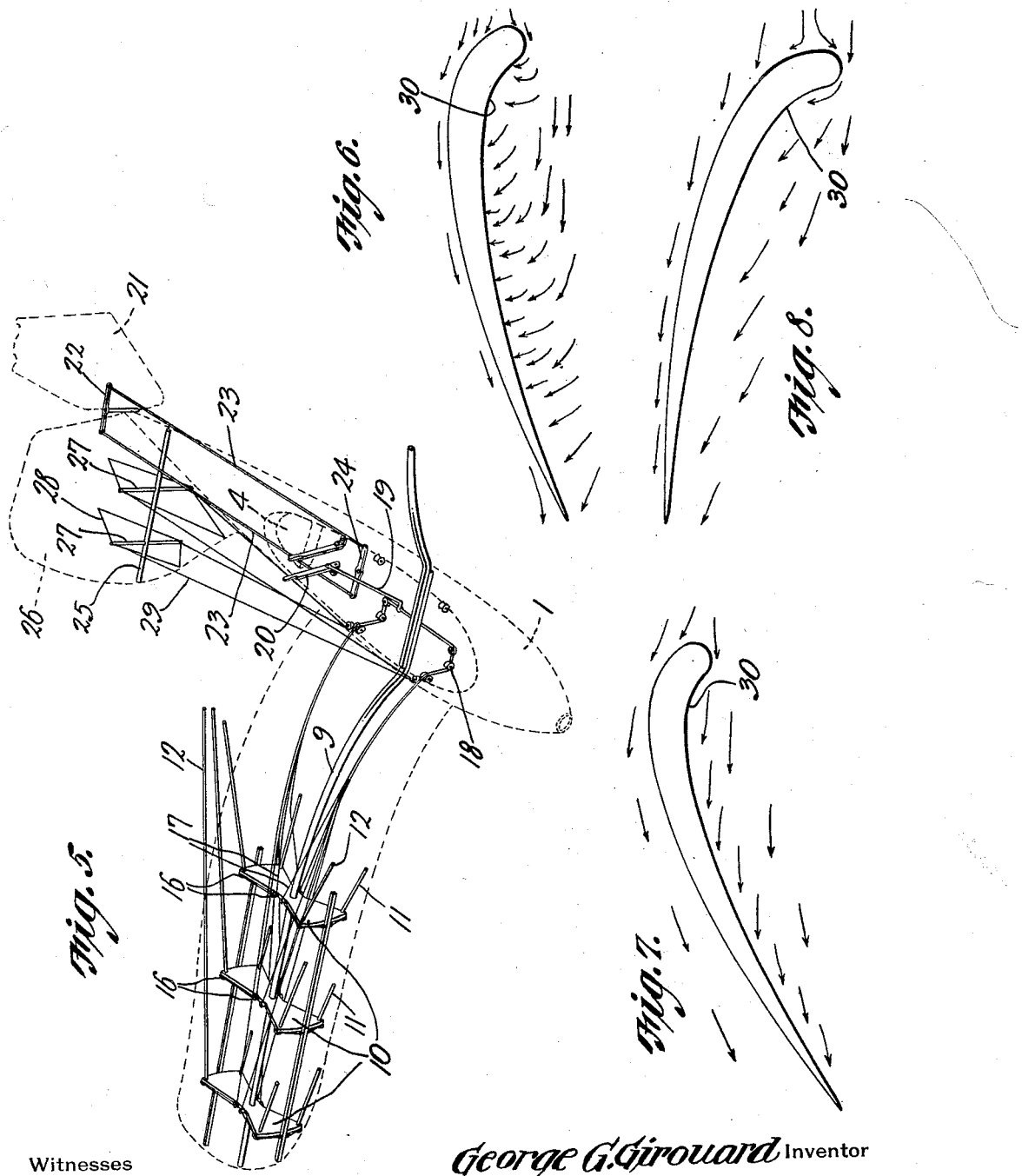

GEORGE G. GIROUARD, OF NASHUA, NEW HAMPSHIRE.

AEROPLANE.

1,163,231.  Specification of Letters Patent. Patented Dec. 7, 1915.

Application filed July 8, 1915. Serial No. 38,730.

*To all whom it may concern:*

Be it known that I, GEORGE G. GIROUARD, a citizen of the United States, residing at Nashua, in the county of Hillsboro and State of New Hampshire, have invented a new and useful Aeroplane, of which the following is a specification.

This invention relates to aeroplanes, one of its objects being to provide an airship of this type utilizing tilting sustaining planes so constructed as to increase the sustaining efficiency of the planes while the machine is in flight.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a front elevation. Fig. 3 is a section on line A—B Fig. 1. Fig. 4 is an enlarged vertical transverse section through one of the sustaining planes. Fig. 5 is a perspective view of a portion of the frame of the machine. Fig. 6 is a view showing diagrammatically the position of the wing while in normal flight, the action of the air currents being indicated by arrows. Fig. 7 is a similar view showing the position of the wing while the machine is ascending. Fig. 8 is another like view showing the position of the wing while the machine is descending.

Referring to the figures by characters of reference 1 designates the body of the machine which is preferably of the peculiar bird shape shown, there being a propeller 2 at the front end or nose of the body, while arranged in the body is a motor 3 and a seat 4. The body is provided with downwardly diverging front and rear supporting yokes 5 connected at their ends by runners 6 which extend forwardly and rearwardly beyond the yokes and are formed of resilient material so as to constitute cushioning connections or springs for an axle 7 which is secured to intermediate portions of the runners and is provided with wheels 8. It is to be understood that when the machine is alighting, the runners will swing upwardly when the wheels come into contact with the ground, the front and rear ends of the runners slidably engaging the ground so as to hold the machine in proper position thereon.

Extending transversely of the body 1 is a stationary wing bar 9 and secured to this bar between the body and each end thereof is a series of guides 10 arranged in pairs, the guides of each pair being oppositely disposed and segmental, as shown particularly in Fig. 4. The ends of the guides are secured at their lower ends to guys 11 extending downwardly to the sides of the yokes 5 while the upper portions of the ends of the guides are connected by guys 12 to an upstanding frame 13 mounted rigidly upon the body 1. Thus it will be seen that the guides are held securely in parallel relation and, with the guys 1 and 12, serve to brace the wing bar 9 and hold it rigid.

As shown particularly in Fig. 2, the wing bar is curved upwardly and outwardly from the body and fixedly mounted on the bar between each pair of guides 10 and the adjacent side of the body 1 is a wing section 14 extending outwardly to a tiltable wing section 15 adapted to work upon the bar 9. Thus it will be seen that each sustaining wing is made up of an inner fixed section and an outer tiltable section. When in their normal positions, each wing constitutes a continuation of the other, and the entire wing follows a gradual upward and outward curve from the side of the body 1 and is then inclined downwardly a slight extent to the tip.

As shown in Fig. 1, each wing, when viewed in plan, has its front edge extended rearwardly along a slight curve merging into a rounded outer end which, in turn, merges into a rear edge which follows a slight curve, it being bowed forwardly. The guides 10 extend through slots or openings formed in the tiltable sections 15 of the sustaining wings, and mounted on the upper and lower portions of the guides 10 are guide sheaves 16 engaged by controlling cords 17. The cords of each wing are extended into engagement with guide sheaves 18 upon the body 1 and their ends approach from opposite directions one end of a member 19 which is attached to a controlling lever 20. Thus when lever 20 is shifted in one direction, the cords 17 will be actuated so as to dip or lower the forward edge of the tiltable section of the sustaining plane and, when moved in the opposite direction, will raise the forward edge of the wing. One lever 20 is provided for each sustaining plane or wing so that the same can be operated independently of each other.

Connected to the rear end of the body 1 so as to swing laterally is a vertical rudder 21 having laterally extending arms 22 connected by cords 23 to a strip 24 adapted to be operated by the feet of the aviator or in any other suitable manner.

Extending laterally from the rear portion of the body are bars 25 adapted to rotate and mounted on each of these bars is a tail plane 26 which, when viewed in plan, has the peculiar contour shown in Fig. 1, the two tail planes diverging rearwardly and having their forward edges converging forwardly. These tail planes have upwardly and downwardly projecting arms 27 from which extend reinforcing guides 28. Controlling cords 29 are extended from the ends of these arms 28 to the guide sheaves 18 and to the members 19 so that when one of the sustaining planes is tilted downwardly at its forward edge, the tail plane at the same side of the machine will be tilted upwardly at its forward edge, and vice versa.

A feature of extreme importance in the present case is the peculiar transverse configuration of the sustaining planes. This peculiar configuration has been determined after exhaustive tests and as a result thereof it has been found that a greater lifting force is obtained than through the use of any of the forms of sustaining planes heretofore employed. By referring to Fig. 6 it will be seen that the upper and lower faces of the wings gradually converge rearwardly along curved lines, while the forward portions of the said faces curve downwardly to form a front or advancing lip back of which is produced a longitudinal concavity 30. While the machine is in horizontal flight, the sustaining wings or planes assume the position illustrated in Fig. 6 and it has been determined definitely that by having the abruptly dipped forward portion of the wing as shown, a rarefied area of air is provided within the concavity 30 which results in splitting the air in advance of the wing and as indicated by the arrows, thus offering less wind resistance to the forward movement of the planes and at the same time causing a portion of the air passing under the plane to pack upwardly within said rarefied area so as thus to give a better sustaining action than would be the case should the bottom face of the plane be flat or but slightly concaved, as ordinarily.

It is thought that the operation of the machine while in flight will be fully understood from the foregoing description. When it is desired to ascend the tiltable sections 15 of the sustaining planes are rocked so that their front edges will be elevated and at the same time the front edges of the tail planes will be lowered. By tilting the sustaining planes independently, the machine can be brought to a condition of transverse equilibrium. Not only is importance attached to the particular configuration of each of the sustaining planes but also to the particular means for supporting and guiding the planes and to the means whereby landing may be effected without subjecting the machine to undesirable strain.

What is claimed is:—

1. An aeroplane including a body, oppositely extending sustaining planes connected thereto, each plane including a wing bar, an inner section fixed relative to the bar and body, an outer section pivotally mounted upon the bar, and segmental guides fixed to the bar and extending through the tiltable section.

2. An aeroplane including a body, oppositely extending sustaining planes connected thereto, each plane including a wing bar, an inner section fixed relative to the bar and body, an outer section pivotally mounted upon the bar, and segmental guides fixed to the bar and extending through the tiltable section, and means secured to the guide and fixedly held at points above and below the body for reinforcing the wing bar.

3. An aeroplane including a body, sustaining planes extending laterally therefrom, each plane being gradually curved upwardly and outwardly, each sustaining plane including an inner fixed section and an outer tiltable section, the faces of one section constituting continuations of the corresponding faces of the other section when the tiltable sections are in their normal positions, tiltably mounted tail planes at the sides of the rear portion of the body and means under the control of the aviator for simultaneously tilting the movable section of one sustaining plane and the tail plane in rear thereof in opposite directions respectively.

4. An aeroplane including a body, oppositely extending sustaining planes secured thereto, each plane including an inner fixed section and an outer tiltable section, guides fixedly mounted relative to the fixed sections and movably engaged by the tiltable sections, runners below and connected to the body, each runner constituting cushioning means, a ground wheel connected to each runner, and guys secured to the guides and extending to points close to the runners.

5. An aeroplane including a body, resilient runners thereunder, connections between the runners and the body, oppositely extending sustaining planes, each plane including an inner fixed section and an outer tiltable section, guides fixed relative to the fixed sections and extending through the tiltable sections, guys extending from the guides to the connections between the body and runners, and ground wheels connected to intermediate portions of the runners.

6. A sustaining plane for aeroplanes, having an intermediate transverse pivot extending therethrough between the upper and lower faces thereof, that portion of the plane in advance of the pivot being curved forwardly and downwardly with its upper and lower faces substantially parallel and merging into a rounded depending lip extending throughout the length of the plane, the upper and lower faces of the plane converging rearwardly along curved lines from points adjacent the pivot, said plane consisting of an inner fixed section carrying the pivot, and an outer tiltable section supported by the pivot, the faces of one section normally constituting continuations of the corresponding faces of the other section.

7. A sustaining plane for aeroplanes, having an intermediate transverse pivot extending therethrough between the upper and lower faces thereof, that portion of the plane in advance of the pivot being curved forwardly and downwardly with its upper and lower faces substantially parallel and merging into a rounded depending lip extending throughout the length of the plane, the upper and lower faces of the plane converging rearwardly along curved lines from points adjacent the pivot, said sustaining plane being curved inwardly and downwardly from an intermediate point and outwardly and downwardly from said intermediate point and having its outer terminal portion upturned.

In testimony that I claim the foregoing as my own, I have hereto affixed my signature.

GEORGE G. GIROUARD.

Copies of this patent may be obtained for five cents each, by addressing the "Commissioner of Patents, Washington, D. C."